United States Patent
Nakamura et al.

(10) Patent No.: US 11,780,034 B2
(45) Date of Patent: Oct. 10, 2023

(54) BRAZING SHEET AND MANUFACTURING METHOD THEREOF

(71) Applicants: UACJ Corporation, Chiyoda-ku (JP); DENSO CORPORATION, Kariya (JP)

(72) Inventors: Shinichi Nakamura, Aichi (JP); Tomoki Yamayoshi, Aichi (JP); Takeyoshi Dokou, Aichi (JP); Takahiro Shinoda, Aichi (JP); Shogo Yamada, Aichi (JP); Yoshihiko Sonoda, Aichi (JP); Naoki Sugimoto, Aichi (JP); Nobuhiro Honma, Aichi (JP); Taketoshi Toyama, Aichi (JP)

(73) Assignees: UACJ CORPORATION, Tokyo (JP); DENSO CORPORATION, Kariya (JP)

( * ) Notice: Subject to any disclaimer, the term of this patent is extended or adjusted under 35 U.S.C. 154(b) by 419 days.

(21) Appl. No.: 17/279,873

(22) PCT Filed: Sep. 27, 2019

(86) PCT No.: PCT/JP2019/038319
§ 371 (c)(1),
(2) Date: Mar. 25, 2021

(87) PCT Pub. No.: WO2020/071289
PCT Pub. Date: Apr. 9, 2020

(65) Prior Publication Data
US 2021/0394311 A1    Dec. 23, 2021

(30) Foreign Application Priority Data
Oct. 1, 2018    (JP) .................... 2018-186840

(51) Int. Cl.
*B23K 35/28* (2006.01)
*B23K 20/04* (2006.01)
(Continued)

(52) U.S. Cl.
CPC ............ *B23K 35/286* (2013.01); *B23K 20/04* (2013.01); *B23K 35/0238* (2013.01);
(Continued)

(58) Field of Classification Search
None
See application file for complete search history.

(56) References Cited

U.S. PATENT DOCUMENTS

| 9,024,442 B2 | 5/2015 | Terashima et al. |
| 10,682,730 B2 | 6/2020 | Itoh et al. |

(Continued)

FOREIGN PATENT DOCUMENTS

| CN | 102666002 A | 9/2012 |
| CN | 107849647 A | 3/2018 |

(Continued)

OTHER PUBLICATIONS

English translation of the International Search Report dated Dec. 17, 2019 for parent application No. PCT/JP2019/038319.

(Continued)

*Primary Examiner* — Daniel J. Schleis
(74) *Attorney, Agent, or Firm* — J-TEK LAW PLLC; Jeffrey D. Tekanic; Scott T. Wakeman (57) ABSTRACT

A brazing sheet (1) includes a core material (11) composed of an Al alloy that contains 0.20-3.0 mass % of Mg; and a filler material (12) layered on the core material and composed of an Al alloy that contains Mg, 6.0-13.0 mass % of Si, and more than 0.050 mass % and 1.0 mass % or less of Bi. The Mg concentration of the filler material becomes continuously lower in a direction from a boundary (122) with the core material to an outermost surface (121). The Mg concentration of the filler material is 0.150 mass % or less at a first depth from the outermost surface that is ⅛ of a thickness ($t_f$) of the filler material and is 5-90% of the (Continued)

amount of Mg in the core material at a second depth from the outermost surface that is ⅞ of the thickness of the filler material.

20 Claims, 2 Drawing Sheets

(51) Int. Cl.
  *B23K 35/02*   (2006.01)
  *C22C 21/02*   (2006.01)
  *C22C 21/08*   (2006.01)
  *C23F 1/20*   (2006.01)
  *F28F 3/02*   (2006.01)
  *B23K 103/10*   (2006.01)
  *B23K 101/14*   (2006.01)

(52) U.S. Cl.
  CPC .............. *C22C 21/02* (2013.01); *C22C 21/08* (2013.01); *C23F 1/20* (2013.01); *F28F 3/025* (2013.01); *B23K 2101/14* (2018.08); *B23K 2103/10* (2018.08); *F28F 2275/04* (2013.01)

(56) References Cited

U.S. PATENT DOCUMENTS

| | | |
|---|---|---|
| 2012/0223430 A1 | 9/2012 | Terashima et al. |
| 2017/0151637 A1 | 6/2017 | Ichikawa et al. |
| 2018/0169798 A1* | 6/2018 | Izumi .................. B23K 35/288 |
| 2018/0200842 A1 | 7/2018 | Itoh et al. |
| 2019/0151973 A1 | 5/2019 | Itoh et al. |
| 2019/0337074 A1 | 11/2019 | Miyake |
| 2020/0061758 A1 | 2/2020 | Itoh et al. |
| 2020/0338671 A1 | 10/2020 | Itoh |
| 2023/0082095 A1* | 3/2023 | Nakamura .......... B23K 35/288 |

FOREIGN PATENT DOCUMENTS

| | | |
|---|---|---|
| CN | 108431260 A | 8/2018 |
| JP | 2014050861 A | 3/2014 |
| JP | 6055573 B1 | 12/2016 |
| JP | 2018099726 A | 6/2018 |
| WO | 2018100793 A1 | 6/2018 |
| WO | 2021199116 A1 | 10/2021 |

OTHER PUBLICATIONS

English translation of the Written Opinion of the International Searching Authority for parent application No. PCT/JP2019/038319.
Office Action from the Japanese Patent Office dated Mar. 29, 2022 in related Japanese application No. 2018-186840, and machine translation thereof.
Office Action and Search Report from the Chinese Patent Office dated Dec. 14, 2021 in related Chinese application No. 201980059697.0, and translation of Search Report.
Machine translation of Office Action and Search Report from the Chinese Patent Office dated Dec. 14, 2021 in related Chinese application No. 201980059697.0.
Office Action dated Apr. 10, 2023, in related U.S. Appl. No. 17/794,809, including examined claims 1-18.

* cited by examiner

BRAZING SHEET AND MANUFACTURING METHOD THEREOF

CROSS-REFERENCE

This application is the US national stage of International Patent Application No. PCT/JP2019/038319 filed on Sep. 27, 2019, which claims priority to Japanese Patent Application No. 2018-186840 filed on Oct. 1, 2018.

TECHNICAL FIELD

The present invention relates to a brazing sheet and to a manufacturing method thereof.

For example, aluminum products, such as heat exchangers, mechanical parts, and the like, have numerous components composed of aluminum materials (which include aluminum and aluminum alloys; likewise, below). It is often the case that these components are brazed using a brazing sheet that has a core material and a filler material, which is provided on at least one surface of the core material. A flux-brazing method is often used as a method of brazing an aluminum material, in which brazing is performed by applying a flux to the surface(s) of an intended joint, i.e., the surface(s) of a portion that is to be joined by brazing.

However, in the flux-brazing method, it is necessary to perform the work of applying the flux prior to brazing and furthermore to perform the work of removing the flux, the residue thereof, and the like after the brazing has been completed. This work leads to an increase in the manufacturing cost of the aluminum product. In addition, in situations such as when the flux, the residue thereof, and the like could not be removed after the brazing was completed and thereafter a surface treatment or the like was performed, there is also a risk that it will lead to deterioration in surface quality.

To avoid the above-mentioned problems attendant with the use of flux, depending on the intended usage of the aluminum product, so-called vacuum-brazing methods are also used, in which brazing is performed in a vacuum without the application of flux to the surfaces of the intended joint. However, vacuum-brazing methods have the problems in that productivity is lower than in flux-brazing methods and the quality of the brazed joint tends to deteriorate. In addition, the equipment cost, the maintenance cost, and the like are higher in brazing furnaces used in vacuum-brazing methods than in common brazing furnaces.

Accordingly, so-called flux-free-brazing methods have been proposed, in which brazing is performed in an inert-gas atmosphere without applying flux to the surfaces of the intended joint. Brazing sheets used in flux-free-brazing methods contain, in at least one layer of the layered structure of the brazing sheet, an element or elements that function(s) to weaken an oxide film or to break down an oxide film on an intended joint. Mg (magnesium) is often used as this type of element.

However, there is a problem in that Mg oxidizes quite readily. Consequently, in the situation in which Mg has simply been added into the filler material, there is a risk that an MgO film will form on the surface of the filler material during the heating when brazing is being performed, which will lead to deterioration in brazeability. To avoid such a problem, a technique has been proposed in which an intermediate material containing Mg is interposed between the core material and the filler material in the brazing sheet, and the Mg is caused to diffuse from the intermediate material into the filler-material surface by the heating during brazing.

For example, in Patent Document 1, a brazing sheet is disclosed that comprises: a core material; an intermediate filler-material layer, which is clad onto the core material and is composed of an Al—Si—Mg series alloy that contains 1 mass % or more and less than 4 mass % of Si (silicon) and 0.1-5.0 mass % of Mg (magnesium); and an outermost-surface, brazing-material layer, which is clad onto the intermediate filler-material layer and is composed of an Al—Si series alloy that contains 4-12 mass % of Si.

PRIOR ART LITERATURE

Patent Document

Patent Document 1
Japanese Patent No. 6055573

However, in the situation in which brazing is performed using the brazing sheet described in Patent Document 1, during the interval until the Mg in the intermediate filler-material layer reaches the surface of the brazing sheet, weakening of the oxide film due to Mg does not occur. Furthermore, because the Mg moves within the intermediate filler-material layer and the outermost-surface, brazing-material layer, which are solid, it takes a comparatively long time until it reaches the surface of the brazing sheet. For this reason, with regard to this brazing sheet, there is a risk that it will lead to the occurrence of the brazing defect described above, for example, in the situation in which the thickness of the filler material is large, in the situation in which the temperature-rise rate is fast, or the like.

In addition, in the situation in which the intermediate material is interposed between the core material and the filler material as in the brazing sheet described in Patent Document 1, the number of layers included in the brazing sheet is greater than the situation in which the intermediate material is not provided, and consequently the configuration of the brazing sheet becomes more complicated. In addition, owing to the number of layers of the brazing sheet becoming greater, there is also a risk that it will lead to a decrease in productivity, an increase in materials cost, or the like.

The present invention was conceived considering this background and aims to provide: a brazing sheet, in which brazeability when brazing in an inert-gas atmosphere is satisfactory and whose structure is simple, as well as a manufacturing method thereof.

One aspect of the present invention is a brazing sheet that can be used in brazing performed in an inert-gas atmosphere without the use of flux, comprising:
  a core material, which is composed of an aluminum alloy that contains 0.20 mass % or more and 3.0 mass % or less of Mg (magnesium); and
  a filler material, which is composed of an aluminum alloy that contains Mg, 6.0 mass % or more and 13.0 mass % or less of Si (silicon), and more than 0.050 mass % and 1.0 mass % or less of Bi (bismuth) and which is layered on at least one side of the core material and is exposed at an outermost surface;
  wherein:
    the filler material:
    has an Mg distribution such that the Mg concentration becomes continuously lower the closer to the outermost surface from a surface of a boundary with the core material;
    at a position at which the depth from the outermost surface is ⅛ of a thickness of the filler material, the Mg concentration is 0.150 mass % or less; and at a position at which the depth from the outermost surface is ⅞ of the thickness of the filler material, the Mg concentration is 5-90% of the amount of Mg in the core material.

The brazing sheet comprises the core material and the filler material, which is layered on at least one side of the core material and which is exposed at an outermost surface. The filler material contains Mg and Bi in the above-mentioned specific ranges. In addition, the Mg in the filler material is distributed such that the Mg concentration becomes continuously lower the closer to the outermost surface from a surface of a boundary with the core material. Furthermore, the Mg concentration at the position at which the depth from the outermost surface is ⅛ of the thickness of the filler material and the Mg concentration at the position at which the depth from the outermost surface is ⅞ of the thickness of the filler material are in the above-mentioned specific ranges, respectively.

The Bi in the filler material can curtail the formation of a dense oxide film on the outermost surface of the brazing sheet caused by the heating during brazing. In addition, the Mg in the filler material lowers the solidus temperature of the filler material and thereby can cause molten filler to be produced starting from a comparatively low temperature. Furthermore, by forming the above-mentioned specific Mg distribution in advance within the filler material, oxidation of the Mg during brazing can be curtailed while at the same time Mg can be rapidly supplied to the outermost surface of the brazing sheet.

Thus, by virtue of the Bi curtailing the formation of an oxide film on the outermost surface of the brazing sheet while at the same time rapidly supplying Mg to the outermost surface, the brazing sheet can break down, at an early stage, the oxide film that is present on an intended joint. Furthermore, by causing molten filler to be produced starting from a comparatively low temperature, the speed at which a fillet is formed on the intended joint can be hastened. Owing to these effects acting synergistically, brazeability in so-called flux-free brazing, which is performed in an inert-gas atmosphere without the use of flux, can be improved.

In addition, with regard to the above-mentioned brazing sheet, because the specific Mg distribution is formed within a single layer called the filler material, it is possible to avoid adding to the number of layers included in the brazing sheet. For this reason, increased complexity of the configuration of the brazing sheet can be avoided, and a decrease in productivity, an increase in materials cost, and the like can be avoided.

As a result of the above, according to the above-mentioned aspects, a brazing sheet can be provided in which brazeability when brazing in an inert-gas atmosphere is satisfactory and whose structure is simple.

DETAILED DESCRIPTION

In the above-mentioned brazing sheet, a filler material is layered on at least one side of a core material. That is, the above-mentioned brazing sheet may have a two-layer structure composed of the core material and the filler material, which is layered on one side of the core material, or may have a three-layer structure composed of the core material and the filler material, which is layered on both surfaces of the core material.

In addition, the above-mentioned brazing sheet may have a multilayer structure of three or more layers comprising: the core material; the filler material, which is layered on one surface of the core material; and a layer that is layered on the other surface of the core material and is composed of an aluminum alloy that differs from that of the core material and the filler material. Examples of such a layer are a sacrificial-anode material, a second filler material having a chemical composition that differs from that of the filler material, or the like.

In the situation in which the filler material is layered on one surface of the core material and the second filler material is layered on the other surface, the second filler material does not have to have the above-mentioned specific Mg distribution. In addition, the second filler material may have a thickness that differs from that of the filler material.

The thickness of the above-mentioned brazing sheet can be appropriately set in the range of, for example, 0.050-2.0 mm. In addition, the cladding percentage of the filler material in the above-mentioned brazing sheet can be appropriately set in the range of, for example, 3-20%. From the viewpoint of causing the Mg in the filler material to reach the outermost surface of the brazing sheet in an early stage, the cladding percentage of the filler material is preferably set to 3-8%.

The chemical composition of each layer constituting the brazing sheet and the reasons for restrictions thereof will now be explained.

(Core Material)

The core material of the above-mentioned brazing sheet is composed of an aluminum alloy that contains 0.20 mass % or more and 3.0 mass % or less of Mg. The aluminum alloy that constitutes the core material may have a chemical composition that contains, for example, 0.20 mass % or more and 3.0 mass % or less of Mg, the remainder being Al (aluminum) and unavoidable impurities. Furthermore, in addition to containing Mg as an essential component, the aluminum alloy that constitutes the core material may further contain Fe (iron), Mn (manganese), Si (silicon), Cu (copper), Zn (zinc), Ti (titanium), and Zr (zirconium) as optional components.

Mg: 0.20 Mass % or More and 3.0 Mass % or Less

Mg in the core material diffuses, owing to the heating when brazing is being performed, in the initial stage of the brazing, that is, in the stage before the filler material melts, and moves from the core material into the solid filler material. Consequently, the total amount of Mg in the filler material gradually increases as the brazing progresses. Furthermore, after the brazing has progressed and molten filler has been formed, an oxide film that is present on the intended joint is broken down by Mg in the molten filler. As a result, brazing of a brazing sheet and an opposing material can be performed without the use of flux.

By setting the amount of Mg in the core material to 0.20 mass % or more, the total amount of the Mg in the molten filler is sufficiently large, and thereby the breakdown of the oxide film can be promoted. As a result, brazeability of the above-mentioned brazing sheet and the opposing material can be improved. In the situation in which the amount of Mg in the core material is less than 0.20 mass %, there is a risk that the total amount of the Mg in the molten filler will be insufficient, which will lead to deterioration in brazeability.

The greater the Mg content in the core material, the more the breakdown of the oxide film is promoted, which can further improve brazeability. From such a viewpoint, the Mg content in the core material is preferably set to 0.40 mass % or more.

However, if the Mg content in the core material becomes excessive, then it will become difficult to obtain the effect of improving brazeability commensurate with that content. In addition, in this situation, there is also a risk that it will lead to deterioration in the ductility of the brazing sheet, the occurrence of erosion due to increased fineness of the crystal grains of the core material, or the like. By setting the amount of Mg in the core material to 3.0 mass % or less and preferably to 1.50 mass % or less, these problems can be avoided while at the same time brazeability of the above-mentioned brazing sheet and the opposing material can be improved.

Fe: 1.0 Mass % or Less

The core material may contain 1.0 mass % or less of Fe as an optional component. Fe acts to increase the strength of the core material. However, if the Fe content becomes excessive, then there is a risk that it will lead to deterioration in the corrosion resistance of the core material. In addition, in this situation, there is also a risk that very large precipitates will tend to be formed in the core material, which will lead to a decrease in the ductility of the brazing sheet. By setting the Fe content to 1.0 mass % or less and more preferably to 0.70 mass % or less, these problems can be avoided while at the same time the strength of the core material can be further increased.

Mn: 1.80 Mass % or Less

The core material may contain 1.80 mass % or less of Mn as an optional component. Mn acts to increase the strength of the core material. In addition, Mn adjusts the electric potential of the core material and thereby acts to improve corrosion resistance. From the viewpoint of further enhancing these effects and results, it is preferable to set the Mn content to 0.60 mass % or more. However, if the Mn content becomes excessive, then cracks in the core material will tend to occur in the manufacturing process of the brazing sheet. By setting the Mn content to 1.80 mass % or less and more preferably to 1.30 mass % or less, the strength and corrosion resistance of the core material can be further increased while avoiding degradation in the manufacturability of the brazing sheet.

Si: 1.0 Mass % or Less

The core material may contain 1.0 mass % or less of Si as an optional component. Si acts to increase the strength of the core material. However, if the Si content becomes excessive, then there is a risk that the melting point of the core material will decrease, which will lead to deterioration in brazeability. By setting the Si content to 1.0 mass % or less, the strength of the core material can be further increased while avoiding degradation in brazeability.

Cu: 1.0 Mass % or Less

The core material may contain 1.0 mass % or less of Cu as an optional component. Cu acts to increase the strength of the core material. In addition, Cu acts to improve corrosion resistance by adjusting the electric potential of the core material. However, if the Cu content becomes excessive, then intergranular corrosion will tend to occur. In addition, in this situation, there is a risk that the melting point of the core material will decrease, which will lead to deterioration in brazeability. By setting the Cu content to 1.0 mass % or less and more preferably to 0.50 mass % or less, these problems can be avoided while at the same time the strength and the corrosion resistance of the core material can be further increased.

Zn: 3.0 Mass % or Less

The core material may contain 3.0 mass % or less of Zn as an optional component. Zn acts to lower the natural electrode potential of the core material. By lowering the natural potential of the core material, the core material can function as a sacrificial anode. However, if the Zn content becomes excessive, then there is a risk that the natural electrode potential of the core material will decrease excessively, which will diminish the sacrificial corrosion-inhibiting effect at an early stage. By setting the Zn content to 3.0 mass % or less and more preferably to 1.5 mass % or less, the sacrificial corrosion-inhibiting effect due to the core material can be maintained over a longer term.

Ti: 0.20 Mass % or Less

The core material may contain 0.20 mass % or less of Ti as an optional component. Ti causes corrosion of the core material to advance in a laminar manner and thereby acts to curtail advancement of corrosion in the depth direction. However, if the Ti content becomes excessive, then huge precipitates will tend to form in the core material, and there is a risk that this will lead to deterioration in rollability in the manufacturing process of the brazing sheet. In addition, in this situation, there is also a risk that it will instead lead to deterioration in the corrosion resistance of the core material. By setting the Ti content to 0.20 mass % or less and more preferably to 0.15 mass % or less, these problems can be avoided while at the same time the advancement of corrosion in the depth direction of the core material can be effectively curtailed.

Zr: 0.50 Mass % or Less

The core material may contain 0.50 mass % or less of Zr as an optional component. Zr increases the grain size of the core material and thereby acts to curtail the occurrence of erosion. However, if the Zr content becomes excessive, then cracks in the core material will tend to occur in the manufacturing process of the brazing sheet. By setting the Zr content to 0.50 mass % or less and more preferably to 0.20 mass % or less, the occurrence of erosion can be curtailed more effectively while avoiding degradation in the manufacturability of the brazing sheet.

(Filler Material)

The filler material of the above-mentioned brazing sheet is composed of an aluminum alloy that contains Mg, 6.0 mass % or more and 13.0 mass % or less of Si, and more than 0.050 mass % and 1.0 mass % or less of Bi. The aluminum alloy that constitutes the filler material may have a chemical composition that contains, for example, Mg, 6.0 mass % or more and 13.0 mass % or less of Si, and more than 0.050 mass % and 1.0 mass % or less of Bi, the remainder being Al (aluminum) and unavoidable impurities. Furthermore, in addition to Mg, Bi, and Si as essential components, the aluminum alloy that constitutes the filler material may further contain Sr (strontium), Sb (antimony), Na (sodium), and Zn (zinc) as optional components.

Si: 6.0 Mass % or More and 13.0 Mass % or Less

The Si in the filler material lowers the melting point of the filler material and thereby acts to produce molten filler during brazing. By setting the Si content to 6.0 mass % or more and preferably to 7.0 mass % or more, a sufficient amount of molten filler is produced during brazing, and thereby brazing of the above-mentioned brazing sheet and the opposing material can be performed. In the situation in which the Si content in the filler material is less than 6.0 mass %, there is a risk that the amount of molten filler will be insufficient, which will lead to deterioration in brazeability.

However, if the Si content in the filler material becomes excessive, then the amount of melted core material during brazing will become excessive, and there is a risk that the strength of the core material after brazing will decrease. In addition, in this situation, coarse primary-phase Si will tend to form in the filler material, and therefore there is a risk that melt holes will tend to be created during heating when brazing is being performed. Furthermore, when hot rolling has been performed in the manufacturing process of the above-mentioned brazing sheet, there is also a risk that the core material will melt locally owing to the presence of primary-phase Si, which will lead to the occurrence of rolling cracks. By setting the Si content in the filler material to 13.0 mass % or less and preferably to 12.0 mass % or less, these problems can be avoided while at the same time a sufficient amount of molten filler can be produced.

Mg

The above-mentioned filler material contains Mg. The Mg in the filler material is distributed such that the Mg concentration becomes continuously lower the closer to the outermost surface from the surface of the boundary with the core material. In addition, at the position at which the depth from the outermost surface of the brazing sheet is ⅛ of the thickness of the filler material, the Mg concentration is 0.150 mass % or less; and at the position at which the depth from the outermost surface of the brazing sheet is ⅞ of the thickness of the filler material, the Mg concentration is 5-90% of the amount of Mg in the core material.

In the present specification and claims, the term "continuously" means the state in which the Mg concentration profile (gradient) produced by plotting the Mg concentration at each depth exhibits a smooth curved shape, wherein the ordinate represents the Mg concentration inside the filler material and the abscissa represents the depth from the outermost surface. For example, the state, in which the filler material is composed of a plurality of layers having differing Mg concentrations and the Mg concentration profile (gradient) exhibits a step shape, is excluded from the concept "continuously."

As described above, Mg that is present in the interior of the filler material reaches the outermost surface of the brazing sheet at a stage earlier than that of Mg in the core material owing to the heating when brazing is being performed. Owing to this Mg, the oxide film that is present on the intended joint can be broken down rapidly. In addition, the Mg in the filler material lowers the solidus temperature of the filler material, and thereby molten filler can be produced starting from a comparatively low temperature.

With regard to the above-mentioned brazing sheet, by setting the Mg concentration to 0.150 mass % or less at the position at which the depth from the outermost surface is ⅛ of the thickness of the filler material, the amount of Mg present on the outermost surface of the brazing sheet can be made sufficiently small. Thereby, the amount of MgO produced in the initial stage of the brazing decreases, and thereby deterioration in brazeability can be avoided.

In the situation in which the Mg concentration at the above-mentioned specific position is more than 0.150 mass %, Mg is oxidized in the initial stage of brazing, and therefore an MgO film tends to be formed on the outermost surface of the brazing sheet. Furthermore, there is a risk that the breakdown of the oxide film present on the intended joint will be hindered by the presence of the MgO film, which will lead to deterioration in brazeability.

In addition, with regard to the above-mentioned brazing sheet, by setting the Mg concentration at the position at which the depth from the outermost surface is ⅞ of the thickness of the filler material to 5% or more and preferably to 20% or more of the amount of Mg in the core material, a suitable amount of Mg can be caused to rapidly reach the outermost surface of the brazing sheet in the initial stage of brazing. As a result, the oxide film present on the intended joint can be rapidly broken down. In addition, in this situation, the solidus temperature of the fillet is appropriately lowered, and thereby the rate at which the fillet is formed can be increased. As a result, brazeability can be improved.

In the situation in which the Mg concentration at the above-mentioned specific position is less than 5% of the amount of Mg in the core material, it becomes difficult, owing to the Mg present in the interior of the filler material, for the oxide film to break down. In addition, in this situation, because the effect of lowering the solidus temperature of the filler material is decreased, there is also a risk that it will lead to a decrease in the rate at which the fillet is formed. As a result, there is a risk that it will lead to a decrease in brazeability.

From the viewpoint of further improving brazeability, it is preferable to make the amount of Mg present in the interior of the filler material large. However, if the amount of Mg present in the interior of the filler material becomes excessive, then the amount of Mg that reaches the outermost surface of the brazing sheet in the initial stage of brazing will become excessive. Consequently, there is a risk that an MgO film will tend to be formed on the outermost surface of the brazing sheet, which will lead to deterioration in brazeability. By setting the Mg concentration at the above-mentioned specific position to 90% or less of the amount of Mg in the core material and preferably to 80% or less, such a problem can be avoided.

Bi: More than 0.050 Mass % and 1.0 Mass % or Less

Bi acts to curtail oxidation of the brazing sheet during brazing. By increasing the Bi content in the filler material to more than 0.050 mass %, the formation of a dense oxide film caused by the heating during brazing can be curtailed, and thereby brazeability can be further improved. Bi is particularly effective in the situation in which brazing is performed in an inert-gas atmosphere wherein the oxygen concentration is comparatively high, such as, for example, the situation in which the oxygen concentration in the brazing atmosphere is approximately 50-500 vol. ppm. From the viewpoint of further enhancing the effect of improving brazeability due to Bi, it is preferable to set the Bi content to 0.10 mass % or more.

However, if the Bi content becomes excessive, then it will become difficult to obtain an effect of brazeability improvement commensurate with the Bi content. By setting the Bi content to 1.0 mass % or less and preferably to 0.60 mass % or less, the effect of improving brazeability commensurate with the Bi content can be obtained.

Sr: 0.10 Mass % or Less, Sb: 0.10 Mass % or Less, Na: 0.30 Mass % or Less

The filler material may contain one or two or more from among Sr: 0.10 mass % or less, Sb: 0.10 mass % or less, and Na: 0.30 mass % or less as optional components. These elements act to increase the bonding strength of the joint, i.e., the fineness of the structure of the solidified filler, formed after brazing. From the viewpoint of further enhancing the effect of increasing the bonding strength due to these elements, it is preferable to set the Sr content to 0.0030 mass % or more, the Sb content to 0.0040 mass % or more, and the Na content to 0.0020 mass % or more.

However, if the Sr, Sb, and Na content each become excessive, then it becomes difficult to obtain the effect of improving brazeability commensurate with the content of these elements. By setting the Sr content to 0.10 mass % or less and preferably to 0.050 mass % or less, the effect of improving brazeability commensurate with the Sr content can be obtained. Likewise, by setting the Sb content to 0.10 mass % or less and preferably to 0.050 mass % or less, the effect of improving brazeability commensurate with the Sb content can be obtained. In addition, by setting the Na content to 0.30 mass % or less and preferably to 0.10 mass % or less, the effect of improving brazeability commensurate with the Na content can be obtained.

Zn: 5.0 Mass % or Less

The filler material may contain 5.0 mass % or less of Zn as an optional component. By performing brazing using filler material that contains Zn, the electric potential of the filler material remaining on the surface of the core material after brazing can be lowered. Furthermore, owing to the sacrificial corrosion-inhibiting effect of the filler material, the corrosion resistance of an aluminum product after brazing can be further improved. From the viewpoint of further enhancing the effect of improving the corrosion resistance of the aluminum product, it is more preferable to set the Zn content to 1.0 mass % or more.

On the other hand, if the Zn content becomes excessive, then there is a risk that the electric potential of the filler material remaining on the surface of the core material will decrease excessively, and thereby the progress of corrosion will be hastened. By setting the Zn content to 5.0 mass % or less and more preferably to 3.0 mass % or less, such a problem can be avoided.

(Sacrificial-Anode Material)

The above-mentioned brazing sheet may comprise: the core material; the above-mentioned filler material, which is layered on one surface of the core material; and the sacrificial-anode material, which is layered on the other surface of the core material and is composed of pure aluminum or an aluminum alloy that contains Zn: 8.0 mass % or less. In this situation, owing to the sacrificial corrosion-inhibiting effect of the sacrificial-anode material, the corrosion resistance of the aluminum product after brazing can be further improved. It is noted that "pure aluminum" mentioned above means an aluminum material in which the Al purity is 99.00 mass % or more.

In the situation in which an aluminum alloy that contains Zn as the sacrificial-anode material is used, that aluminum alloy may have a chemical composition that, for example, contains Zn: more than 0 mass % and 8.0 mass % or less, the remainder being Al and unavoidable impurities. From the viewpoint of further enhancing the effect of improving the corrosion resistance of the aluminum product, it is more preferable to set the Zn content to 0.50 mass % or more.

On the other hand, if the Zn content becomes excessive, then there is a risk that the electric potential of the sacrificial-anode material will decrease excessively, thereby hastening the progress of corrosion. By setting the Zn content to 8.0 mass % or less and more preferably to 5.0 mass % or less, such a problem can be avoided while at the same time the sacrificial corrosion-inhibiting effect can be further enhanced.

The aluminum alloy that constitutes the sacrificial-anode material may further contain one or two from among In (indium): 0.0050-0.100 mass % and Sn (tin): 0.0050-0.100 mass %. In and Sn act to lower the natural electrode potential of the sacrificial-anode material, the same as Zn does. However, if the In and Sn content each become excessive, then there is a risk that the natural electrode potential of the sacrificial-anode material will decrease excessively, which will lead to deterioration in self-corrosion resistance.

By setting the In and Sn content each to 0.0050 mass % or more and more preferably to 0.010 mass % or more, the sacrificial corrosion-inhibiting effect due to the sacrificial-anode material can be further enhanced. In addition, by setting the In and Sn content each to 0.100 mass % or less and more preferably to 0.050 mass % or less, the sacrificial corrosion-inhibiting effect can be obtained while at the same time deterioration in self-corrosion resistance can be avoided.

The sacrificial-anode material may further contain Mg: 3.0 mass % or less. Mg in the sacrificial-anode material can break down the oxide film present on the surface of the sacrificial-anode material. For this reason, by using an Mg-containing aluminum alloy as the sacrificial-anode material, the wettability of the sacrificial-anode material with respect to the molten filler can be improved, and thereby it is possible to braze the sacrificial-anode material and another component.

However, if the Mg content in the sacrificial-anode material becomes excessive, then there is a risk that Mg oxides will be formed on the surface of the sacrificial-anode material, which will lead to deterioration in brazeability. By setting the Mg content in the sacrificial-anode material to 3.0 mass % or less and more preferably to 1.5 mass % or less, the formation of Mg oxides can be curtailed while at the same time brazeability can be improved.

The sacrificial-anode material may further contain one or two or more from among Mn: 2.0 mass % or less, Si: 1.5 mass % or less, Cu: 1.0 mass % or less, Ti: 0.30 mass % or less, Zr: 0.30 mass % or less, and Cr: 0.30 mass %. These elements act to increase the strength of the brazing sheet by forming intermetallic compounds in the aluminum matrix or by forming a solid solution in the aluminum matrix.

(Second Filler Material)

The brazing sheet may comprise: the core material; the above-mentioned filler material, which is layered on one surface of the core material; and the second filler material, which is layered on the other surface of the core material and is composed of an aluminum alloy that differs from that of the core material and the filler material. Well-known Al—Si series alloys can be used as the aluminum alloy that constitutes the second filler material.

The brazing sheet of the above-mentioned aspect can be prepared by, for example, the manufacturing method described in the aspect below.

First, a cladding slab is prepared that comprises: a core-material slab, which has the chemical composition of the above-mentioned core material; and a filler-material slab, which is overlayed on the core-material slab and is composed of an aluminum alloy that contains 6.0 mass % or more and 13.0 mass % or less of Si and more than 0.050 mass % and 1.0 mass % or less of Bi.

By hot rolling this cladding slab, a cladding material is prepared by joining the layers that constitute the cladding slab.

Next, the above-mentioned Mg distribution is formed in the filler material by performing one or more passes of cold rolling on the cladding material and by causing the Mg to diffuse by heating the cladding material one or more times in at least one from among between passes of the cold rollings and after the last pass.

The cladding slab can be configured as a layered structure that corresponds to the configuration of the desired brazing sheet. For example, in the situation in which one is trying to prepare a brazing sheet having a three-layer structure that comprises the core material and the above-mentioned filler material, which is layered on both surfaces of the core material, a cladding slab having a three-layer structure should be prepared by overlaying a filler-material slab on both surfaces of the core-material slab.

The hot rolling of the cladding slab can be performed under the condition in which, for example, the rolling-start temperature has been set to 400-500° C. In addition, during the hot rolling, it is preferable to perform the rolling such that the thickness of the cladding material is more than 200% of the thickness of the desired brazing sheet. Because rolling is performed at a comparatively high temperature in hot rolling, Mg in the core-material slab diffuses into the filler-material slab during the rolling, and thereby a very thin Mg diffusion layer can be formed inside the filler material of the cladding material.

By setting the thickness of the cladding material to more than 200% of the thickness of the brazing sheet, the Mg diffusion layer is compressed in the thickness direction during the cold rolling to be subsequently performed and thereby can be made thin enough to the extent that the thickness of the Mg diffusion layer can be ignored. As a result, in heat treatments that are subsequently performed, the desired Mg distribution can be formed with good accuracy. In the situation in which the thickness of the cladding material is 200% of the thickness of the brazing sheet or less, the amount of compression of the Mg diffusion layer during the cold rolling to be subsequently performed tends to be insufficient. If the amount of compression of the Mg diffusion layer is insufficient, then the need arises to diffuse Mg from the core material into the filler material while considering the thickness of the Mg diffusion layer in the heat treatments to be subsequently performed. As a result, there is a risk that the setting of the heat-treatment conditions will become complicated.

After the cladding material has been prepared by hot rolling, one or more passes of the cold rolling is/are performed on the cladding material, and the Mg is caused to diffuse by heating the cladding material one or more times in at least one from among between passes of the cold rollings and after the last pass. That is, in the situation in which one pass of the cold rolling is performed on the cladding material to make it the desired thickness, the above-mentioned Mg distribution should be formed by heating the cladding material after the cold rolling. In addition, in the situation in which two or more passes of the cold rolling are performed on the cladding material to make it the desired thickness, for example, the above-mentioned heating may be performed between any of the passes or may be performed after the last pass. Furthermore, it is also possible to perform the above-mentioned heating at two or more timings from among between passes of the cold rollings and after the last pass.

In addition, the heating for diffusing the Mg may be performed concurrently with the heat treatments, such as the so-called intermediate annealing, final annealing, and the like, for adjusting the mechanical characteristics or may be performed as a process separate from these heat treatments.

When the Mg is to be diffused from the above-mentioned core material into the above-mentioned filler material, it is preferable to heat the above-mentioned cladding material under the condition in which the value of D listed in Equation (1) below becomes $3.0\times10^{-15}$-$3.0\times10^{-9}$, and it is more preferable to heat the above-mentioned cladding material under the condition in which the value of D listed in Equation (1) below becomes $3.0\times10^{-11}$-$3.0\times10^{-9}$.

Equation 1

$$D = \sum_{k=1}^{n} 10^{-8} Th_k^{-2} \int_{t_{k0}}^{t_{k1}} 1.24\times10^{-4} e^{-\frac{130000}{RT(t)}} dt \quad (1)$$

With the proviso that, in the above-mentioned Equation (1), n is the number of times heating was performed while the thickness of the above-mentioned cladding material is in the range of 100-200% of the thickness of the above-mentioned brazing sheet; $Th_k$ is a thickness (m) of the filler material of the above-mentioned cladding material in the $k^{th}$ heating; R is the gas constant (J/mol·K); $t_{k0}$ is the time at the point in time when the temperature of the above-mentioned cladding material in the $k^{th}$ heating has exceeded 50° C.; $t_{k1}$ is the time at the point in time when the temperature of the above-mentioned cladding material in the $k^{th}$ heating has fallen below 50° C.; and T(t) is the temperature (K) of the above-mentioned cladding material at time t. In addition, the unit of the differential of time dt in Equation (1) is seconds.

The value of D in Equation (1) is a value that corresponds to the total of the Mg diffusion distances in the heating performed when the thickness of the cladding material is within the range of 100-200% of the thickness of the brazing sheet. By setting the value of D in the above-mentioned specific range, Mg can be suitably diffused into the filler material, and thereby the above-mentioned specific Mg distribution can be formed more reliably.

In the manufacturing method of the above-mentioned aspect, the surface of the brazing sheet may be etched, as needed, using acid. The oxide film, which is formed by the heating during the hot rolling, the heating performed when diffusing the Mg, and the like, can be weakened or removed by performing the etching. As a result, the brazeability of the brazing sheet can be further improved.

The time period during which etching is performed is not particularly limited, as long as it is during the interval from after hot rolling has been performed until brazing is performed using the brazing sheet. For example, the clad sheet may be etched after the hot rolling, or the clad sheet may be etched in the middle of the cold rolling. In addition, etching may be performed after the heat treatments have been performed or after the heat treatments performed up until all cold rollings are completed.

In addition, etching may be performed on the brazing sheet immediately after all the heatings and cold rollings described above have been completed. Furthermore, after all the heatings and the cold rollings described above have been performed and the brazing sheet is stored in the state in which it has the oxide film described above, etching may be performed immediately before brazing is performed. As long as the oxide film described above is weakened or removed when brazing is performed, brazeability during brazing in which the above-mentioned brazing sheet is used can be improved.

For example, an aqueous solution of sulfuric acid, hydrochloric acid, nitric acid, phosphoric acid, hydrofluoric acid, or the like can be used as the acid that is used in the etching of the brazing sheet. Any of these acids may be used as a standalone, or two or more of the acids may be used in combination. From the viewpoint of removing the oxide film more efficiently, it is preferable to use as the acid a mixed aqueous solution that contains hydrofluoric acid and an acid other than hydrofluoric acid, and it is more preferable to use a mixed aqueous solution of hydrofluoric acid and sulfuric acid or a mixed aqueous solution of hydrofluoric acid and nitric acid.

In the etching, the etching amount is preferably 0.05-2 g/m$^2$. By setting the etching amount to 0.05 g/m$^2$ or more and more preferably to 0.1 g/m$^2$ or more, the oxide film on the brazing-sheet surface can be sufficiently removed, and thereby brazeability can be further improved.

From the viewpoint of improving the brazeability of the brazing sheet, an upper limit on the etching amount does not exist. However, if the etching amount becomes excessive, then there is a risk that the effect of improving brazeability commensurate with the processing time will no longer be able to be obtained. By setting the etching amount to 2 g/m$^2$ or less and more preferably to 0.5 g/m$^2$ or less, such a problem can be avoided.

WORKING EXAMPLES

Working examples of the brazing sheet and the manufacturing method thereof are explained below. It is noted that the aspects of the brazing sheet and the manufacturing method thereof according to the present invention are not limited to the aspects of the working examples described below, and the constitutions can be modified as appropriate within a range that does not depart from the gist thereof.

The chemical compositions of the core materials used in the present example are as listed in Table 1 (Alloy Symbols A1-A14). In addition, the chemical compositions of the filler materials used in the present example are as listed in Table 2 (Alloy Symbols B1-B10). The symbol "-" in Table 1 and Table 2 is a symbol that indicates that the particular element is not actively added and the content does not exceed that of an unavoidable impurity. In addition, the symbol "Bal." in the same tables indicates the remainder.

TABLE 1

| | Chemical Composition (mass %) | | | | | | | | |
|---|---|---|---|---|---|---|---|---|---|
| Alloy Symbol | Mg | Fe | Mn | Si | Cu | Zn | Ti | Zr | Al |
| A1 | 0.20 | — | — | — | — | — | — | — | Bal. |
| A2 | 0.50 | — | — | — | — | — | — | — | Bal. |
| A3 | 1.0 | — | — | — | — | — | — | — | Bal. |
| A4 | 2.0 | — | — | — | — | — | — | — | Bal. |
| A5 | 3.0 | — | — | — | — | — | — | — | Bal. |
| A6 | 1.0 | 0.50 | — | — | — | — | — | — | Bal. |
| A7 | 1.0 | — | 1.20 | — | — | — | — | — | Bal. |
| A8 | 1.0 | — | — | 0.50 | — | — | — | — | Bal. |
| A9 | 1.0 | — | — | — | 0.20 | — | — | — | Bal. |
| A10 | 1.0 | — | — | — | — | 0.20 | — | — | Bal. |
| A11 | 1.0 | — | — | — | — | — | 0.10 | — | Bal. |
| A12 | 1.0 | — | — | — | — | — | — | 0.10 | Bal. |
| A13 | 0.0 | — | — | — | — | — | — | — | Bal. |
| A14 | 4.0 | — | — | — | — | — | — | — | Bal. |

TABLE 2

| | Chemical Composition (mass %) | | | | | | |
|---|---|---|---|---|---|---|---|
| Alloy Symbol | Si | Bi | Sr | Sb | Na | Zn | Al |
| B1 | 10.0 | 0.100 | — | — | — | — | Bal. |
| B2 | 7.0 | 0.200 | — | — | — | — | Bal. |
| B3 | 12.0 | 0.080 | — | — | — | — | Bal. |
| B4 | 10.0 | 0.800 | — | — | — | — | Bal. |
| B5 | 10.0 | 0.100 | 0.020 | — | — | — | Bal. |
| B6 | 10.0 | 0.100 | — | 0.020 | — | — | Bal. |
| B7 | 10.0 | 0.100 | — | — | 0.050 | — | Bal. |
| B8 | 10.0 | 0.100 | — | — | — | 4.0 | Bal. |
| B9 | 5.0 | 0.100 | — | — | — | — | Bal. |
| B10 | 14.0 | 0.100 | — | — | — | — | Bal. |

Working Example 1

Figure 1:
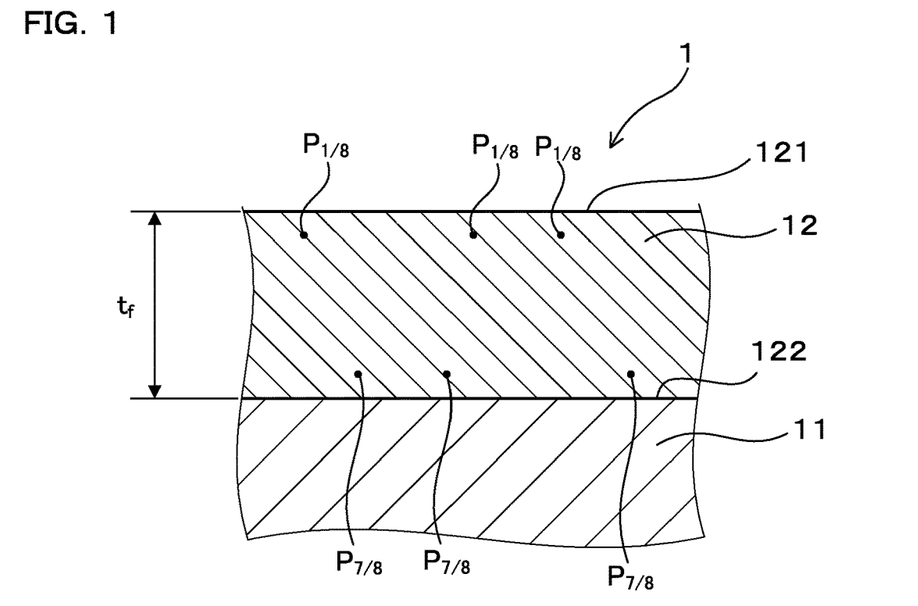
FIG. 1 is a partial, cross-sectional view that shows the principal parts of a brazing sheet in Working Example 1.

The present example is an example (refer to FIG. 1) of a brazing sheet 1 having a two-layer structure composed of a core material 11 and a filler material 12, which is layered on one side of the core material 11, as shown in FIG. 1. The method of preparing the brazing sheet 1 of the present example was as below. First, core-material slabs having the chemical compositions (Alloy Symbols A1-A14) listed in Table 1 were prepared by continuous casting. Next, each core-material slab was milled to set the thickness of the core-material slab to a prescribed thickness.

In addition, apart from the core-material slabs, filler-material slabs having the chemical compositions (Alloy Symbols B1-B10) listed in Table 2 were prepared by continuous casting. Next, each filler-material mass was hot rolled to set the thickness of the filler-material mass to a prescribed thickness.

Cladding slabs were prepared by overlaying the core-material slabs and the filler-material slabs obtained in this manner using the combinations listed in Table 3 and Table 4. Cladding materials having a thickness of 3.0 mm were prepared by hot rolling the obtained cladding slabs and joining the core-material slabs and the filler-material slabs.

Next, multiple passes of the cold rolling were performed on the cladding materials such that the thicknesses of the cladding materials became the values listed in Table 3 and Table 4. Furthermore, after the last pass of the cold rollings, the cladding materials were heated under heating conditions in which the values of D in the above-mentioned Equation (1) became the values listed in Table 3 and Table 4. It is noted that hold temperatures during this heating could be selected from within the range of, for example, 350-450° C. In addition, hold times could be selected from within the range of, for example, 1-24 h. Based on the above, Test Materials C1-C38 listed in Table 3 and Table 4 could be obtained.

Mg Distribution in Filler Material

The Mg distribution in the filler material 12 for each test material could be evaluated using the method below. First, each test material was cut in the sheet-width direction, after which the exposed cross section was mirror polished. In this cross section, as shown in FIG. 1, analysis positions $P_{1/8}$ at three points, at each of which the depth from the outermost surface 121 of the test material was ⅛ of the thickness $t_f$ of the filler material 12, were randomly selected. The Mg concentration at each of these analysis positions $P_{1/8}$ was measured by performing a point analysis at each of these analysis positions $P_{1/8}$ using an EPMA (i.e., an electronic-probe microanalyzer). Furthermore, the value that is the average of the Mg concentrations at the analysis positions $P_{1/8}$ was taken as the Mg concentration $c_{1/8}$ at the position at which the depth from the outermost surface 121 was ⅛ of the thickness of the filler material. The Mg concentration $c_{1/8}$ of the particular position for each test material was as listed in Table 3 and Table 4.

In addition, by changing the positions at which the point analysis was performed using the EPMA to analysis positions $P_{7/8}$, at which the depth from the outermost surface 121 of the test material was ⅞ of the thickness of the filler material, and then performing the same evaluation as mentioned above, the Mg concentration $c_{7/8}$ at the position at which the depth from the outermost surface was ⅞ of the thickness of the filler material could be obtained. The Mg concentration $c_{7/8}$ at that position for each test material was as listed in Table 3 and Table 4. It is noted that, in Table 3 and Table 4, in addition to the actual value of the Mg concentration $c_{7/8}$ at the above-mentioned position for each test material, the ratio (%) of the Mg concentration $c_{7/8}$ at the above-mentioned position relative to the amount of Mg in the filler material has been recorded.

Evaluation of Brazeability Using a Gap-Filling Test

Figure 2:
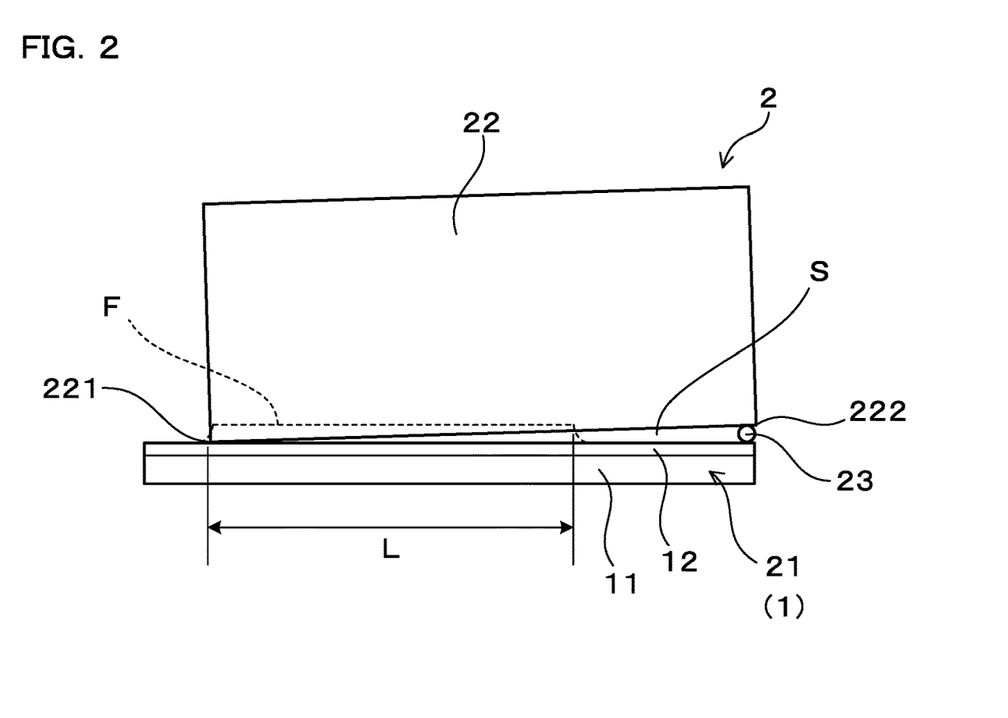
FIG. 2 is a side view of a test specimen used in a gap-filling test in Working Example 1.

By performing a gap-filling test, the brazeability of each test material could be evaluated. As shown in FIG. 2, a test specimen 2 used in the gap-filling test comprised a horizontal sheet 21, which was sampled from the test material, and a perpendicular sheet 22, which was disposed on the filler material 12 of the horizontal sheet 21. The perpendicular sheet 22 was disposed with an orientation that was orthogonal to the horizontal sheet 21. In addition, one end 221 of the perpendicular sheet 22 in the longitudinal direction is in contact with the filler material 12 of the horizontal sheet 21. It is noted that the width of the horizontal sheet 21 in the present example was 25 mm and the length was 60 mm. In addition, the perpendicular sheet 22 was an aluminum sheet that was composed of a JIS A3003 alloy, having a width of 25 mm, a length of approximately 55 mm, and a thickness of 1 mm.

A spacer 23 was interposed between other end 222 of the perpendicular sheet 22 in the longitudinal direction and the horizontal sheet 21. Thereby, a gap S, which gradually widened from the one end 221 of the perpendicular sheet 22 toward the spacer 23 side, was formed between the horizontal sheet 21 and the perpendicular sheet 22. It is noted that the spacer 23 in the present example was, specifically, a round wire that was made of stainless steel having a diameter of 1.6 mm and was disposed at a location at which it was separated by 55 mm in the horizontal direction from the location (the one end 221) at which the perpendicular sheet 22 is in contact with the horizontal sheet 21.

With regard to the test specimens 2 in which Test Materials C1-C29 and Test Materials C33-C38 were used, each of the test specimens 2 was assembled after a degreasing treatment was performed on the horizontal sheet 21 and the perpendicular sheet 22. In addition, with regard to the test specimens 2 in which Test Materials C30-C32 were used, each of the test specimens 2 was assembled after sequentially performing the degreasing treatment on the horizontal sheet 21 and the perpendicular sheet 22 and etching using acid. Subsequently, each of the test specimens 2 was brazed. It is noted that the application of flux before brazing was not performed for any of the test specimens.

The brazing of each of the test specimens was performed using a nitrogen-gas furnace. The in-furnace atmosphere was made into a nitrogen-gas atmosphere having an oxygen concentration of 10 vol. ppm or less. In addition, the heating for brazing was performed by raising the temperature of each test specimen until the temperature became 600° C., after which the temperature of 600° C. was held for 3 min. After the heating for brazing was completed, the test specimen was cooled in the furnace until the temperature fell to a certain extent, after which the test specimen was removed to outside of the furnace.

In the gap-filling test, brazeability could be evaluated based on the length L and the shape of the fillet F (refer to FIG. 2), which was formed after the brazing. The results of having performed brazing on three of the test specimens 2 were recorded in the "Fillet Length" columns in Table 3 and Table 4, wherein the symbol "A+" was recorded in the case in which the average of the lengths L filled by the filler within the gap S was 25 mm or more, the symbol "A" was recorded in the case of 15 mm or more and less than 25 mm, and the symbol "B" was recorded in the case of less than 15 mm. In addition, in the "Fillet Shape" columns in the same tables, the symbol "A" was recorded in the case in which the width of the fillet was uniform and was formed equally on both sides of the perpendicular sheet 22, and the symbol "B" was recorded in the case in which the width of the fillet was uneven or was formed on only one side of the perpendicular sheet 22.

In the evaluation of brazeability, the situation in which the fillet length was "A+" or "A" and the fillet shape was "A" was determined to be acceptable because it had excellent brazeability. In addition, the situation in which the fillet length was "B" or the fillet shape was "B" was determined to be unacceptable because it was poor in brazeability.

TABLE 3

| Test Material Symbol | Filler Material Alloy Symbol | Filler Material Thickness (μm) | Core Material Alloy Symbol | Total Thickness (mm) | Value of D | Etching | Mg Distribution Mg Concentration at $c_{1/8}$ (mass %) | Mg Distribution Mg Concentration at $c_{7/8}$ (mass %) | Ratio (%) of $c_{7/8}$ to Amount of Mg in Core Material | Brazeability Fillet Length Average of Filled Lengths L (mm) | Determination | Fillet Shape |
|---|---|---|---|---|---|---|---|---|---|---|---|---|
| C1 | B1 | 60 | A1 | 0.6 | $7.6 \times 10^{-11}$ | No | 0.000 | 0.100 | 50.1 | 23.0 | A | A |
| C2 | B1 | 60 | A2 | 0.6 | $7.6 \times 10^{-11}$ | No | 0.020 | 0.152 | 30.4 | 23.0 | A | A |
| C3 | B1 | 60 | A3 | 0.6 | $7.6 \times 10^{-11}$ | No | 0.040 | 0.282 | 28.2 | 24.0 | A | A |
| C4 | B1 | 60 | A4 | 0.6 | $7.6 \times 10^{-11}$ | No | 0.050 | 0.542 | 27.1 | 24.5 | A | A |
| C5 | B1 | 60 | A5 | 0.6 | $7.6 \times 10^{-11}$ | No | 0.060 | 0.802 | 26.7 | 25.0 | A+ | A |
| C6 | B1 | 60 | A1 | 0.6 | $4.5 \times 10^{-10}$ | No | 0.010 | 0.123 | 61.3 | 23.0 | A | A |
| C7 | B1 | 60 | A2 | 0.6 | $4.5 \times 10^{-10}$ | No | 0.030 | 0.191 | 38.2 | 23.0 | A | A |
| C8 | B1 | 60 | A3 | 0.6 | $4.5 \times 10^{-10}$ | No | 0.050 | 0.363 | 36.3 | 25.0 | A+ | A |
| C9 | B1 | 60 | A4 | 0.6 | $4.5 \times 10^{-10}$ | No | 0.070 | 0.706 | 35.3 | 26.0 | A+ | A |
| C10 | B1 | 60 | A5 | 0.6 | $4.5 \times 10^{-10}$ | No | 0.090 | 1.049 | 35.0 | 25.0 | A | A |
| C11 | B2 | 60 | A2 | 0.6 | $4.5 \times 10^{-10}$ | No | 0.030 | 0.191 | 38.2 | 22.0 | A | A |
| C12 | B3 | 60 | A2 | 0.6 | $4.5 \times 10^{-10}$ | No | 0.030 | 0.191 | 38.2 | 24.0 | A | A |
| C13 | B4 | 60 | A2 | 0.6 | $4.5 \times 10^{-10}$ | No | 0.030 | 0.191 | 38.2 | 23.0 | A | A |
| C14 | B5 | 60 | A2 | 0.6 | $4.5 \times 10^{-10}$ | No | 0.030 | 0.191 | 38.2 | 24.0 | A | A |
| C15 | B6 | 60 | A2 | 0.6 | $4.5 \times 10^{-10}$ | No | 0.030 | 0.191 | 38.2 | 23.5 | A | A |
| C16 | B7 | 60 | A2 | 0.6 | $4.5 \times 10^{-10}$ | No | 0.030 | 0.191 | 38.2 | 23.5 | A | A |
| C17 | B8 | 60 | A2 | 0.6 | $4.5 \times 10^{-10}$ | No | 0.030 | 0.191 | 38.2 | 24.0 | A | A |
| C18 | B1 | 60 | A1 | 0.6 | $1.0 \times 10^{-9}$ | No | 0.030 | 0.134 | 66.9 | 24.5 | A | A |

TABLE 4

| Test Material Symbol | Filler Material Alloy Symbol | Filler Material Thickness (μm) | Core Material Alloy Symbol | Total Thickness (mm) | Value of D | Etching | Mg Distribution Mg Concentration at $c_{1/8}$ (mass %) | Mg Distribution Mg Concentration at $c_{7/8}$ (mass %) | Ratio (%) of $c_{7/8}$ to Amount of Mg in Core Material | Brazeability Fillet Length Average of Filled Lengths L (mm) | Determination | Fillet Shape |
|---|---|---|---|---|---|---|---|---|---|---|---|---|
| C19 | B1 | 60 | A2 | 0.6 | $1.0 \times 10^{-9}$ | No | 0.070 | 0.211 | 42.2 | 25.0 | A+ | A |
| C20 | B1 | 60 | A3 | 0.6 | $1.0 \times 10^{-9}$ | No | 0.090 | 0.403 | 40.3 | 25.5 | A+ | A |
| C21 | B1 | 60 | A4 | 0.6 | $1.0 \times 10^{-9}$ | No | 0.110 | 0.788 | 39.4 | 25.0 | A+ | A |
| C22 | B1 | 60 | A5 | 0.6 | $1.0 \times 10^{-9}$ | No | 0.140 | 1.173 | 39.1 | 25.0 | A | A |
| C23 | B1 | 60 | A6 | 0.6 | $4.5 \times 10^{-10}$ | No | 0.050 | 0.363 | 36.3 | 27.0 | A+ | A |
| C24 | B1 | 60 | A7 | 0.6 | $4.5 \times 10^{-10}$ | No | 0.050 | 0.363 | 36.3 | 27.0 | A+ | A |
| C25 | B1 | 60 | A8 | 0.6 | $4.5 \times 10^{-10}$ | No | 0.050 | 0.363 | 36.3 | 27.0 | A+ | A |
| C26 | B1 | 60 | A9 | 0.6 | $4.5 \times 10^{-10}$ | No | 0.050 | 0.363 | 36.3 | 27.0 | A+ | A |
| C27 | B1 | 60 | A10 | 0.6 | $4.5 \times 10^{-10}$ | No | 0.050 | 0.363 | 36.3 | 28.0 | A+ | A |
| C28 | B1 | 60 | A11 | 0.6 | $4.5 \times 10^{-10}$ | No | 0.050 | 0.363 | 36.3 | 27.0 | A+ | A |
| C29 | B1 | 60 | A12 | 0.6 | $4.5 \times 10^{-10}$ | No | 0.050 | 0.363 | 36.3 | 27.0 | A+ | A |
| C30 | B1 | 60 | A5 | 0.6 | $1.0 \times 10^{-9}$ | Yes | 0.140 | 1.173 | 39.1 | 29.0 | A+ | A |
| C31 | B1 | 60 | A6 | 0.6 | $4.5 \times 10^{-10}$ | Yes | 0.050 | 0.363 | 36.3 | 28.0 | A+ | A |
| C32 | B1 | 60 | A7 | 0.6 | $4.5 \times 10^{-10}$ | Yes | 0.050 | 0.363 | 36.3 | 29.0 | A+ | A |
| C33 | B9 | 60 | A3 | 0.6 | $4.5 \times 10^{-10}$ | No | 0.050 | 0.363 | 36.3 | 3.5 | B | B |
| C34 | B10 | 60 | A3 | 0.6 | $4.5 \times 10^{-10}$ | No | 0.040 | 0.363 | 36.3 | Unevaluatable because core material melted | | |
| C35 | B1 | 60 | A13 | 0.6 | $4.5 \times 10^{-10}$ | No | 0.000 | 0.000 | — | 6.0 | B | B |
| C36 | B1 | 60 | A14 | 0.6 | $4.5 \times 10^{-10}$ | No | 0.020 | 1.370 | 34.3 | Unevaluatable because of erosion | | |
| C37 | B1 | 60 | A2 | 0.6 | $1.0 \times 10^{-15}$ | No | 0.010 | 0.020 | 4.0 | 3.5 | B | B |
| C38 | B1 | 60 | A4 | 0.6 | $3.0 \times 10^{-8}$ | No | 1.380 | 1.410 | 70.5 | 4.0 | B | B |

As shown in Table 3 and Table 4, with regard to each of Test Materials C1-C32, the chemical compositions of the core material 11 and the filler material 12 were within the above-mentioned specific ranges, and an Mg distribution was formed in the interior of the filler material 12 such that the Mg concentration became continuously lower the closer to the outermost surface 121 from a boundary surface 122 (refer to FIG. 1), which is the surface of the boundary with the core material 11. Furthermore, the Mg concentration $c_{1/8}$ at the position at which the depth from the outermost surface 121 was ⅛ of the thickness $t_f$ of the filler material 12 was 0.150 mass % or less, and the Mg concentration $c_{7/8}$ at the position at which the depth from the outermost surface 121 was ⅞ of the thickness $t_f$ of the filler material 12 was 5-90% of the amount of Mg in the core material 11. Consequently, according to these test materials, brazeability in flux-free brazing could be improved.

Among these test materials as well, Test Materials C30-C32 were etched using acid. Consequently, brazeability could be improved for Test Materials C30-C32 more than for Test Materials C22-C24, which, other than etching not having been performed, had the identical composition.

With regard to Test Material C33, because the Si content in the filler material was below the above-mentioned specific range, the filler produced during brazing tended to be insufficient. Consequently, the situation in which Test Material C33 was used tended to produce brazing defects more than the situations in which Test Materials C1-C32 were used.

With regard to Test Material C34, because the Si content in the filler material was above the above-mentioned specific range, the core material tended to be eroded by the molten filler during brazing. Consequently, in the situation in which Test Material C34 was used, there was a risk that the core material would melt and thereby brazing could no longer be performed.

With regard to Test Material C35, because the core material did not contain Mg, diffusion of Mg from the core material to the filler material did not occur. Consequently, with regard to Test Material C35, brazing could not be performed without using flux.

With regard to Test Material C36, because the Mg content in the core material was above the above-mentioned specific range, the amount of Mg that diffused from the core material to the filler material tended to become excessive. Consequently, with regard to Test Material C36, there was a risk that the fineness of the crystal grains of the core material would increase during brazing, which will lead to the occurrence of erosion.

With regard to Test Material C37, because the value of D in Equation (1) was below the above-mentioned specific range, the amount of Mg that diffused from the core material into the filler material tended to be insufficient. Consequently, in the situation in which Test Material C37 was used, brazing defects tended to occur more than in Test Materials C1-C32.

With regard to Test Material C38, because the value of D in Equation (1) was above the above-mentioned specific range, the amount of Mg that reached the surface of the filler material tended to become excessive. Consequently, in the situation in which Test Material C38 was used, there was a risk that a dense film of MgO would be formed on the outermost surface of the test material during brazing, which will lead to deterioration in brazeability.

Working Example 2

The present example is an example of the brazing sheet in which the thickness was 1.0 mm. Other than changing the thickness to 1.0 mm, Test Materials D1-D4 of the present example listed in Table 5 could be prepared using the same method as was used for Test Materials C1-C38 in Working Example 1.

With regard to the test specimens 2 in which Test Materials D1-D3 were used, each of the test specimens 2 was assembled after the degreasing treatment was performed on the horizontal sheet 21 and the perpendicular sheet 22. In addition, with regard to the test specimen 2 in which Test Material D4 was used, the test specimen 2 was assembled after the degreasing treatment and the etching, in which acid was used, were sequentially performed on the horizontal sheet 21 and the perpendicular sheet 22. Subsequently, the test specimens 2 were brazed under the same conditions as in Working Example 1. It is noted that flux was not applied prior to brazing for any of the test specimens 2. With regard to Test Materials D1-D4, the results of having evaluated the Mg distribution and brazeability using the same methods as in Working Example 1 are listed in Table 5.

It is noted that the results of having performed brazing on three of the test specimens 2 were recorded in the "Fillet Length" column in Table 5, wherein the symbol "A+" was recorded in the case in which the average of the lengths filled by the filler within the gap S was 30 mm or more, the symbol "A" was recorded in the case of 20 mm or more and less than 30 mm, and the symbol "B" was recorded in the case of less than 20 mm. In addition, in the "Fillet Shape" columns in the same tables, the symbol "A" was recorded in the case in which the width of the fillet was uniform and was formed equally on both sides of the perpendicular sheet 22, and the symbol "B" was recorded in the case in which the width of the fillet was uneven or was formed on only one side of the perpendicular sheet 22.

In the evaluation of brazeability, the situation in which the fillet length was "A+" or "A" and the fillet shape was "A" was determined to be acceptable because it had excellent brazeability. In addition, the situation in which the fillet length was "B" or the fillet shape was "B" was determined to be unacceptable because it was poor in brazeability.

TABLE 5

| Test Material Symbol | Filler Material Alloy Symbol | Filler Material Thickness (μm) | Core Material Alloy Symbol | Total Thickness (mm) | Value of D | Etching | Mg Concentration at $c_{1/8}$ (mass %) | Mg Concentration at $c_{7/8}$ (mass %) | Ratio (%) of $c_{7/8}$ to Amount of Mg in Core Material | Average of Filled Lengths L (mm) | Determination | Fillet Shape |
|---|---|---|---|---|---|---|---|---|---|---|---|---|
| D1 | B1 | 100 | A2 | 1 | $7.6 \times 10^{-11}$ | No | 0.000 | 0.104 | 20.8 | 30.0 | A | A |
| D2 | B1 | 100 | A2 | 1 | $4.5 \times 10^{-10}$ | No | 0.010 | 0.144 | 28.8 | 32.0 | A | A |
| D3 | B1 | 100 | A2 | 1 | $1.0 \times 10^{-9}$ | No | 0.040 | 0.171 | 34.3 | 33.0 | A | A |
| D4 | B1 | 100 | A2 | 1 | $7.6 \times 10^{-11}$ | Yes | 0.000 | 0.104 | 20.8 | 30.0 | A | A |

As shown in Table 5, with regard to each of Test Materials D1-D4, the chemical compositions of the core material and the filler material were within the above-mentioned specific ranges, and the above-mentioned specific Mg distribution was formed in the interior of the filler material. Consequently, according to these test materials, brazeability in flux-free brazing could be improved. In addition, based on a comparison of Test Material D1 and Test Material D4, for which the chemical compositions of the core material and the filler material were identical, it could be understood that the length of the fillet further increases and that brazeability further improves by the performance of an etching in which acid is used.

Working Example 3

The present example is an example of a brazing sheet having a three-layer structure, in which the filler material was layered on both surfaces of the core material. Each of Test Materials E1-E6 of the present example listed in Table 6 could be prepared by overlaying a filler-material slab on both surfaces of the core-material slab and then sequentially performing hot rolling, cold rolling, and heating using the same methods as in Working Example 1. It is noted that the thickness of each of Test Materials E1-E6 in the present example was 0.050 mm.

Figure 3:
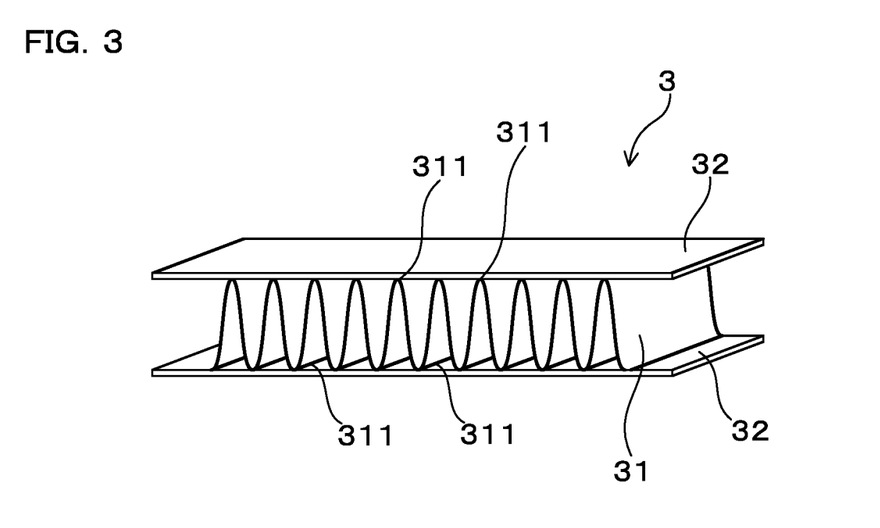
FIG. 3 is an oblique view of a mini-core test specimen in Working Example 3.

In the present example, brazeability was evaluated using a mini-core test specimen 3 that simulates the core of a corrugated-fin-type heat exchanger. As shown in FIG. 3, the mini-core test specimen 3 comprises a corrugated fin 31, which is composed of a test material, and two flat sheets 32, which sandwich the corrugated fin 31. The length of the corrugated fin 31 in the present example was 50 mm, the height was 10 mm, and the pitch between adjacent peak parts 311 was 3 mm. In addition, each of the flat sheets 32 in the present example was an aluminum sheet composed of a JIS A3003 alloy and in which the length was 60 mm, the width was 16 mm, and the thickness was 0.50 mm.

With regard to the mini-core test specimens 3 in which Test Materials E1-E4 and Test Material E6 were used, each of the mini-core test specimens 3 was assembled after having performed the degreasing treatment on the corrugated fin 31 and the flat sheets 32. With regard to the mini-core test specimen 3 in which Test Material E5 was used, degreasing treatment was performed on the corrugated fin 31 and the flat sheets 32, and then etching was performed, using acid, on the corrugated fin 31. Subsequently, the mini-core test specimen 3 was assembled using the corrugated fin 31 and the flat sheets 32. The assembled mini-core test specimen 3 was brazed under the same conditions as in Working Example 1. It is noted that flux was not applied prior to brazing for any of the mini-core test specimens 3.

The method of evaluating brazeability of each of the mini-core test specimens 3 was as below. First, the corrugated fin 31 was cut away from the mini-core test specimen 3 after brazing. Furthermore, the length of each of the flat sheets 32 in the width direction was measured where traces of fillets were present on the flat sheets 32, and the total of these was calculated. Separate from this, the total of the lengths of the fillets in the sheet-width direction was calculated for a case in which it was assumed that the flat sheets 32 and the corrugated fin 31 were completely joined. Furthermore, the ratio of the former value with respect to the latter value was taken as the bonding percentage (%) of the corrugated fin 31 in each of the test specimens 3. It is noted that the latter value can be calculated by, for example, multiplying the width of the corrugated fin 31 by the number of the peak parts 311 of the corrugated fin 31.

The results of having performed brazing on three of the mini-core test specimens 3 were recorded in the "Brazeability" column in Table 6, wherein the symbol "A" was recorded in the case in which the average of the bonding percentages was 80% or more, and the symbol "B" was recorded in the case of less than 80%. In the evaluation of brazeability in the present example, the situation in which the average of the bonding percentages was 80% or more was determined to be acceptable because it had excellent brazeability. In addition, the situation in which the average of the bonding percentages was less than 80% was determined to be unacceptable because it was poor in brazeability.

TABLE 6

| Test Material Symbol | Filler Material Alloy Symbol | Filler Material Thickness (μm) | Core Material Alloy Symbol | Total Thickness (mm) | Value of D | Etching | Mg Concentration at $c_{1/8}$ (mass %) | Mg Concentration at $c_{7/8}$ (mass %) | Ratio (%) of $c_{7/8}$ to Amount of Mg in Core Material | Brazeability Bonding Percentage (%) | Determination |
|---|---|---|---|---|---|---|---|---|---|---|---|
| E1 | B1 | 5 | A2 | 0.05 | $1.0 \times 10^{-14}$ | No | 0.010 | 0.030 | 6.0 | 95 | A |
| E2 | B1 | 5 | A2 | 0.05 | $7.6 \times 10^{-11}$ | No | 0.010 | 0.100 | 20.0 | 95 | A |
| E3 | B1 | 5 | A2 | 0.05 | $4.5 \times 10^{-10}$ | No | 0.010 | 0.180 | 36.0 | 100 | A |
| E4 | B1 | 5 | A2 | 0.05 | $1.0 \times 10^{-9}$ | No | 0.030 | 0.200 | 40.0 | 100 | A |
| E5 | B1 | 5 | A2 | 0.05 | $7.6 \times 10^{-11}$ | Yes | 0.010 | 0.100 | 20.0 | 100 | A |
| E6 | B1 | 5 | A2 | 0.05 | $3.0 \times 10^{-8}$ | No | 0.350 | 0.360 | 72.0 | 20 | B |

As shown in Table 6, with regard to each of Test Materials E1-E5, the chemical compositions of the core material and the filler material were within the above-mentioned specific ranges, and the above-mentioned specific Mg distribution was formed in the interior of the filler material. Consequently, according to these test materials, brazeability in flux-free brazing could be improved. Among these test materials as well, Test Material E5 was etched using acid. Consequently, with regard to Test Material E5, brazeability could be improved more than in Test Material E2, which, other than etching not having been performed, had the same composition.

On the other hand, with regard to Test Material E6, because the value of D in Equation (1) was below the above-mentioned specific range, the amount of Mg that diffused from the core material into the filler material tended to be insufficient. Consequently, in the situation in which Test Material E6 was used, brazing defects tended to occur more than in Test Materials E1-E5.

It can be understood from the results of Working Example 1 to Working Example 3 explained above that, by setting the chemical compositions of the core material and the filler material to within the above-mentioned specific ranges and forming the specific Mg distribution in the interior of the filler material, brazing sheets are obtained that excel in brazeability in flux-free brazing.

The invention claimed is:

1. A brazing sheet for use in brazing performed in an inert-gas atmosphere without flux, comprising:
   a core material composed of an aluminum alloy that contains 0.20 mass % or more and 3.0 mass % or less of Mg; and
   a filler material composed of an aluminum alloy that contains Mg, 6.0 mass % or more and 13.0 mass % or less of Si, and more than 0.050 mass % and 1.0 mass % or less of Bi, the filler material being layered on at least one side of the core material and exposed at an outermost surface of the brazing sheet;
   wherein:
   the filler material:
      has an Mg distribution such that the Mg concentration becomes continuously lower in a direction from a surface of a boundary with the core material toward the outermost surface;
      at a position at which the depth from the outermost surface is 1/8 of the thickness of the filler material, the Mg concentration is 0.150 mass % or less; and
      at a position at which the depth from the outermost surface is 7/8 of the thickness of the filler material, the Mg concentration is 5-90% of the amount of Mg in the core material.

2. The brazing sheet according to claim 1, wherein the filler material further contains one or two or more elements selected from the group consisting of Sr: 0.10 mass % or less, Sb: 0.10 mass % or less, and Na: 0.30 mass % or less.

3. The brazing sheet according to claim 1, wherein the filler material further contains Zn: 5.0 mass % or less.

4. The brazing sheet according to claim 1, wherein the core material further contains one or two or more elements selected from the group consisting of Fe: 1.0 mass % or less, Mn: 1.80 mass % or less, Si: 1.0 mass % or less, Cu: 1.0 mass % or less, Zn: 3.0 mass % or less, Ti: 0.20 mass % or less, and Zr: 0.50 mass % or less.

5. The brazing sheet according to claim 1, wherein the filler material is layered on both surfaces of the core material.

6. The brazing sheet according to claim 1, wherein the brazing sheet comprises: the core material; the filler material layered on a first surface of the core material; and a sacrificial-anode material composed of pure aluminum or an aluminum alloy that contains Zn: 8.0 mass % or less, the sacrificial-anode material being layered on a second surface of the core material.

7. The brazing sheet according to claim 6, wherein the sacrificial-anode material is composed of an aluminum alloy that further contains one or two or more elements selected from the group consisting of Mn: 2.0 mass % or less, Mg: 3.0 mass % or less, Si: 1.5 mass % or less, Fe: 1.0 mass % or less, Cu: 1.0 mass % or less, Ti: 0.3 mass % or less, Zr: 0.3 mass % or less, and Cr: 0.3 mass % or less.

8. The brazing sheet according to claim 6, wherein the sacrificial-anode material is composed of an aluminum alloy that further contains one or two or more elements selected from the group consisting of In: 0.0050-0.100 mass % and Sn: 0.0050-0.100 mass %.

9. A method of manufacturing the brazing-sheet according to claim 1, comprising:
   preparing a cladding slab comprising: a core-material slab, which has the chemical composition of the core material; and a filler-material slab, which is composed of an aluminum alloy that contains 6.0 mass % or more and 13.0 mass % or less of Si and more than 0.050 mass % and 1.0 mass % or less of Bi, the filler-material slab being overlayed on the core-material slab;
   preparing a cladding material by hot rolling the cladding slab to join layers that constitute the cladding slab; and
   forming the Mg distribution in the filler material by performing one or more passes of cold rolling on the cladding material and diffusing Mg by heating the cladding material one or more times between passes of the cold rollings and/or after a last pass of the cold rolling.

10. The brazing-sheet manufacturing method according to claim 9, comprising:
   when Mg is to be diffused from the core material into the filler material, heating the cladding material under conditions such a value of D in Equation (1) below becomes $3.0 \times 10^{-15}$-$3.0 \times 10^{-9}$ $$D = \sum_{k=1}^{n} 10^{-8} Th_k^{-2} \int_{t_{k0}}^{t_{k1}} 1.24 \times 10^{-4} e^{-\frac{130000}{RT(t)}} dt \quad (1)$$

wherein in Equation (1) above,
n is the number of times heating was performed in an interval during which the thickness of the cladding material is in the range of 100-200% of the thickness of the brazing sheet;
$Th_k$ is the thickness (m) of the filler material of the cladding material in the $k^{th}$ heating;
R is the gas constant (J/mol·K);
$t_{k0}$ is the time at the point in time at which the temperature of the cladding material has exceeded 50° C. in the $k^{th}$ heating,
$t_{k1}$ is the time at the point in time at which the temperature of the cladding material falls below 50° C. in the $k^{th}$ heating, and
T(t) is the temperature (K) of the cladding material at time t.

11. The brazing-sheet manufacturing method according to claim 9, comprising:
   etching a surface of the cladding material using acid in an interval from after the hot rolling has been performed until brazing is performed using the brazing sheet.

12. The brazing-sheet manufacturing method according to claim 11, wherein 0.05-2 g/m² of the surface of the cladding material is etched in the etching step.

13. The brazing-sheet manufacturing method according to claim 12, comprising:
   when Mg is to be diffused from the core material into the filler material, heating the cladding material under conditions such a value of D in Equation (1) below becomes $3.0 \times 10^{-15}$-$3.0 \times 10^{-9}$ $$D = \sum_{k=1}^{n} 10^{-8} Th_k^{-2} \int_{t_{k0}}^{t_{k1}} 1.24 \times 10^{-4} e^{-\frac{130000}{RT(t)}} dt \quad (1)$$

wherein in Equation (1) above,
n is the number of times heating was performed in an interval during which the thickness of the cladding material is in the range of 100-200% of the thickness of the brazing sheet;
$T_hk$ is the thickness (m) of the filler material of the cladding material in the $k^{th}$ heating;

R is the gas constant (J/mol·K);

$t_{k0}$ is the time at the point in time at which the temperature of the cladding material has exceeded 50° C. in the $k^{th}$ heating, $t_{k1}$ is the time at the point in time at which the temperature of the cladding material falls below 50° C. in the $k^{th}$ heating, and T(t) is the temperature (K) of the cladding material at time t.

14. A brazing sheet, comprising:

a core layer composed of an aluminum alloy that contains Mg: 0.20-3.0 mass %; and a filler layer directly joined to the core layer and being composed of an aluminum alloy that contains Mg, Si: 6.0-13.0 mass % and Bi: greater than 0.050 mass % and 1.0 mass % or less;

wherein:

an outermost surface of the brazing sheet is defined on the filler layer;

an Mg concentration gradient of the filler layer continuously decreases in a direction from a boundary with the core material toward the outermost surface;

at a first depth from the outermost surface that is ⅛ of the thickness of the filler layer, the filler layer has an Mg concentration of 0.150 mass % or less; and at a second depth from the outermost surface that is ⅞ of the thickness of the filler layer, the filler layer has an Mg concentration that is 5-90% of the amount of Mg in the core layer.

15. The brazing sheet according to claim 14, wherein the Mg content in the core layer is 0.40-1.50 mass %.

16. The brazing sheet according to claim 15, wherein the Mg concentration at the second depth is 20-80% of the amount of Mg in the core layer.

17. The brazing sheet according to claim 16, wherein the Bi content in the filler layer is 0.10-0.60 mass %.

18. The brazing sheet according to claim 17, wherein:

the brazing sheet has a thickness of 0.050-2.0 mm; and the thickness of the filler layer is 3-8% of the thickness of the core layer.

19. A heat-exchanger, comprising:

two sheets of an aluminum alloy, and the brazing sheet according to claim 18 shaped as a corrugated fin and brazed between the two sheets of aluminum alloy.

20. A heat-exchanger, comprising:

two sheets of an aluminum alloy, and the brazing sheet according to claim 1 shaped as a corrugated fin and brazed between the two sheets of aluminum alloy.

* * * * *